United States Patent
Morris

(10) Patent No.: US 7,200,213 B2
(45) Date of Patent: Apr. 3, 2007

(54) SYSTEMS AND METHODS FOR AN OPERATOR SYSTEM SERVICE

(75) Inventor: Stuart Morris, South Plainfield, NJ (US)

(73) Assignee: Glowpoint, Inc., Hillside, NJ (US)

( * ) Notice: Subject to any disclaimer, the term of this patent is extended or adjusted under 35 U.S.C. 154(b) by 0 days.

(21) Appl. No.: 10/990,351

(22) Filed: Nov. 17, 2004

(65) Prior Publication Data

US 2005/0105711 A1 May 19, 2005

Related U.S. Application Data

(60) Provisional application No. 60/520,670, filed on Nov. 18, 2003.

(51) Int. Cl.
*H04J 3/16* (2006.01)

(52) U.S. Cl. .......................... 379/201.03; 379/207.12; 379/265.09; 379/88.18; 455/414.1; 370/252

(58) Field of Classification Search ................ 379/52, 379/265.09, 93.14, 93.17, 45, 88.18, 88.25, 379/201.03, 203.1, 203.2, 207.12, 265.1; 370/352; 455/414.1
See application file for complete search history.

(56) References Cited

U.S. PATENT DOCUMENTS

| | | | |
|---|---|---|---|
| 4,805,207 A * | 2/1989 | McNutt et al. .......... 379/88.25 |
| 6,683,937 B1 * | 1/2004 | Watson et al. ................ 379/52 |
| 6,744,858 B1 * | 6/2004 | Ryan et al. .................... 379/45 |
| 6,925,165 B2 * | 8/2005 | Cohen et al. .......... 379/265.01 |

* cited by examiner

*Primary Examiner*—Gerald Gauthier
(74) *Attorney, Agent, or Firm*—Morrison & Foerster LLP

(57) ABSTRACT

The present invention relates to systems and methods for providing live operator service for a communication session over a packet-based network. The live operator of the invention can receive a call and conference with the caller to determine an intended call recipient. The live operator can then initiate a call to the intended call recipient. If the intended call recipient is available, the operator can connect the caller to the intended call recipient and disconnect itself from the call.

23 Claims, 5 Drawing Sheets

SYSTEMS AND METHODS FOR AN OPERATOR SYSTEM SERVICE

FIELD OF INVENTION

This invention relates to systems and methods for using a live video operator to facilitate communications sessions in packet-based networks.

BACKGROUND

Telephone operator services have long been a familiar part of the telecommunications industry. Historically, telephone operators, accessed by dialing "0," have provided users with call assistance, number information, billing credits, emergency assistance, and other services. Additionally, live operators within organizations have performed the function of answering calls, connecting calls, informing callers about the availability of the called party, and connecting callers with voicemail. Live operator services have typically been limited to telephony-based, voice-only, service offerings exclusive to service providers as part of the Public Switched Telephone Network (PSTN).

The transfer of voice and video traffic over packet-based networks, and especially over Internet Protocol (IP) networks, is rapidly gaining acceptance. While the infrastructure supporting video and voice calls made over a packet-based network is highly reliable, it is still possible that a call cannot be completed as the caller intended. This failure to complete a call may be because the intended call recipient is temporarily unavailable, a failure of the enduser equipment, or a network failure has occurred, for example.

As the industry providing these services continues to grow and supplants traditional PSTN communications, it is increasingly important that it provide a full complement of traditional communications services to users. Thus, there is a need to provide familiar operator services on multimedia video and voice over a packet-switched networks.

SUMMARY OF THE INVENTION

Broadly described herein are systems and methods for providing a live operator service for a communications network. In one embodiment, the invention is a method for operator assisted calls in a video communications network including designating, at a gatekeeper, an operator endpoint as a provider of an operator service, receiving, at the gatekeeper, a call from a caller endpoint, determining if the call is an operator call, and if the call is an operator call, routing the call to the operator endpoint, and creating a communication session between the caller endpoint and the operator endpoint. In further embodiments, the invention includes methods for determining a recipient endpoint of the call, suspending the communication session between the caller endpoint and the operator endpoint, and creating a communication session between the operator endpoint and the recipient endpoint. In still further embodiments, the invention includes determining if an operator is logged in at the operator endpoint, determining if the operator is available to accept an incoming call at the operator endpoint, and accepting the call at the operator endpoint.

In another embodiment, the invention is a system for operator assisted calls in a video communications network including an operator server in electronic communication with an operator endpoint and a gatekeeper wherein the operator server is configured to receive a call from a caller endpoint and, in response to the call, create a communication session between the caller endpoint and an operator endpoint. In a further embodiments, the invention includes an operator server further configured to determine a recipient endpoint of the call, suspend the communication session between the caller endpoint and the operator endpoint, and create a communication session between the operator endpoint and the recipient endpoint.

In still further embodiments of the invention, the operator server can be configured to determine if an operator at an operator endpoint is logged in, determine if the operator at the operator endpoint is available to accept an incoming call, and create a communication session between the operator server and the caller endpoint.

BRIEF DESCRIPTION OF THE DRAWINGS

The invention will be better understood by reference to the Detailed Description of the Invention when taken together with the attached drawings, wherein.

DETAILED DESCRIPTION OF THE INVENTION

Technologies and Protocols

Video and other multimedia devices connected on an IP based wide-area network (WAN) need to be able to communicate via a common standard protocol. This protocol should allow devices to interoperate seamlessly and to negotiate the highest quality video and audio algorithms which these devices are able to support.

Figure 1:
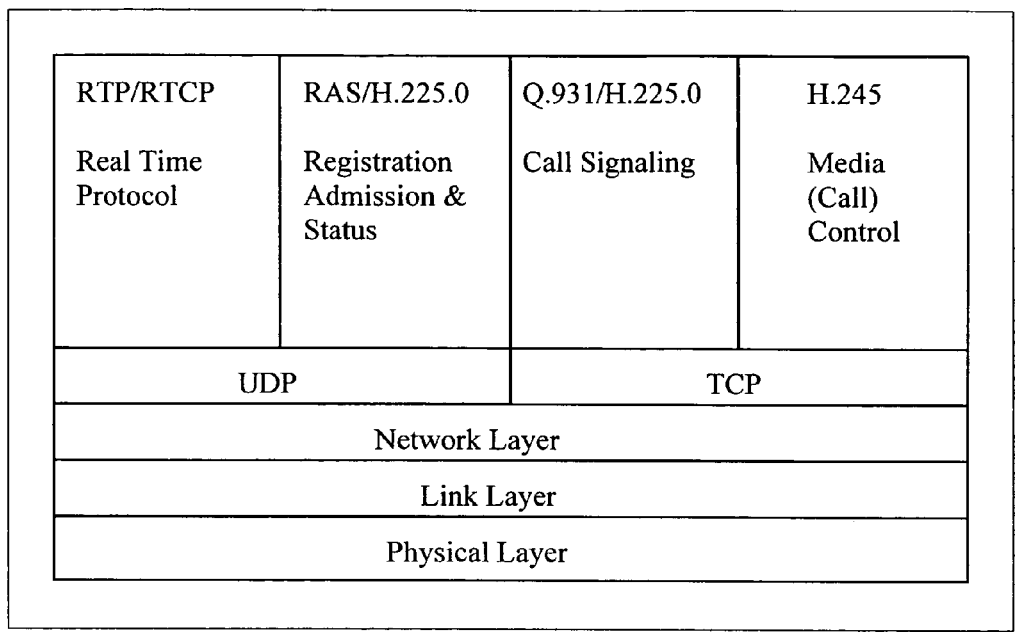
FIG. 1 shows the H.323 protocol stack.

ITU-T H.323 is one example of such a multimedia conferencing protocol and is shown in FIG. 1. The H.323 protocol allows voice, video, and data conferencing over packet-switched networks. The H.323 protocol is a framework that describes how various components interact. As shown in FIG. 1, H.323 also includes H.225.0 which defines the call signaling and communication between video and voice endpoints and a gatekeeper. Additionally, H.245 is used to negotiate audio and video capabilities and to control aspects of the conference between two or more multimedia endpoints.

In the H.323 framework, the originating calling party endpoint determines call capabilities, including bandwidth and coder/decoders (CODECS). For example, a call can be established with either H.261 or H.263 video and G.728 audio for low bandwidth calls, or G.722 audio for high bandwidth calls. G.711 audio is also supported by H.323 for legacy-type endpoints.

The present invention can be configured to use existing and approved multimedia standards including, but not limited to, H.323, H.225, H.245, RTP/RTCP. The present intention can also be configured to use the Simple Network Management Protocol (SNMP) for system management functions. The systems and methods of the invention can utilize typical LAN multimedia devices such as H.323 gatekeepers, server hardware running the Microsoft Windows™ server operating system, PC workstations with internet browsers, and H.323 compliant videoconferencing systems. While the embodiments described below are described with reference to H.323 compliant systems, one skilled in the art would recognize that other protocols, such as Session Initiated Protocol (SIP), as well as audio, video and data conferencing standards could be used without departing from the scope of the invention.

The Operator System (OS) of the present invention can be configured as a client-server software-based solution that can queue and route H.323 (IP) or H.320 (ISDN via a H.320–H.323 gateway) video calls to a live video operator. The OS of the present invention can perform functions similar to those of a typical call center and can include Automatic Call Distributor (ACD) functionality which can queue and forward voice calls. Because the OS can be configured in a client-server architecture, the person performing the live operator function can be at any geographic location as long as the location has access to the Internet and an H.323 standards based videoconferencing system. The operator, wherever located, can assist callers by providing number information accessed though a database link to a standard SQL database and can provide technical assistance or any other information that a live operator could access and present to a caller through audio or video means. In addition, as described in more detail below, the operator can transfer the originating caller to any endpoint on the network or off the network including to an ISDN endpoint via an H.323/H.320 gateway.

The OS can also combine multimedia standards based devices to proxy multimedia calls from end-users with H.323 based videoconferencing CODECs through a server-based system.

Logical System

Figure 2:
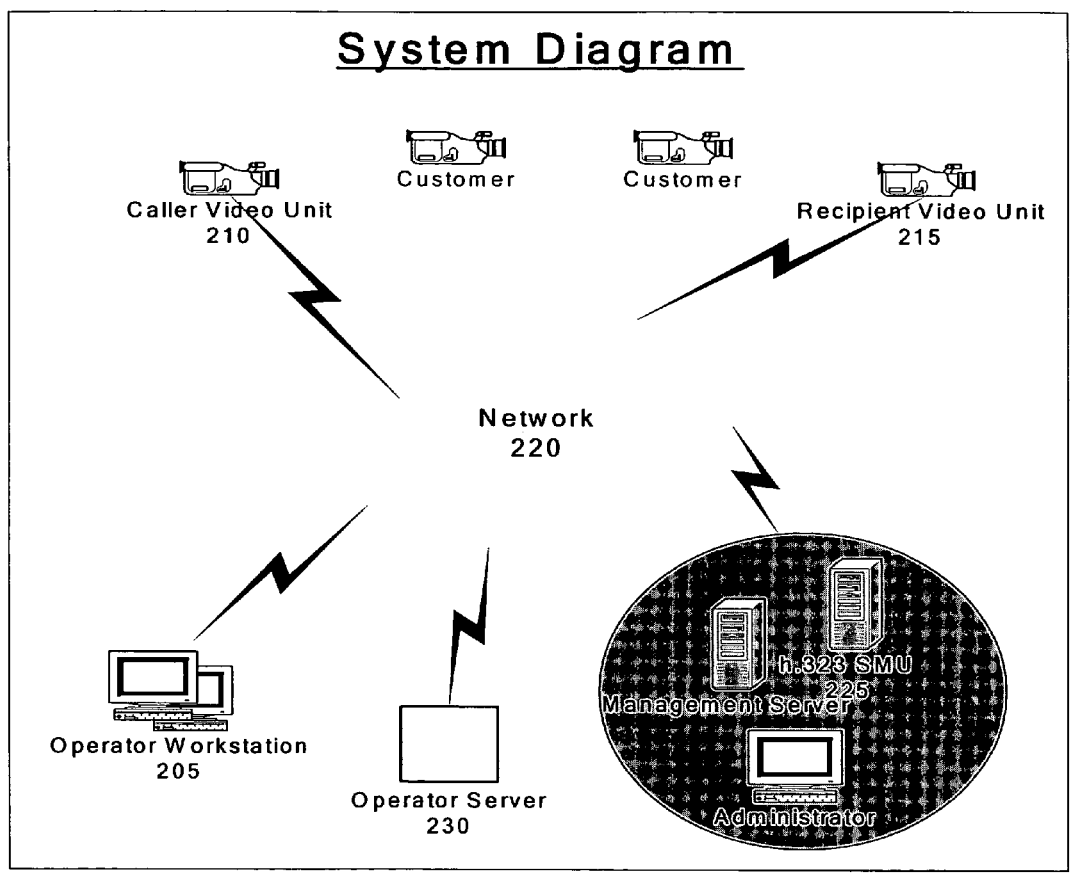
FIG. 2 shows an logical diagram of an exemplary system.

A logical diagram of one exemplary embodiment is shown in FIG. 2. As shown in FIG. 2, the caller video unit (210) and recipient video unit (215) are connected via network (220). Operator (205) and OS Service Module Unit (SMU) (225) are also connected to the network (220). An Operator Server (230) configured to facilitate call transfer operations can also be connected to the network (220).

Figure 3:
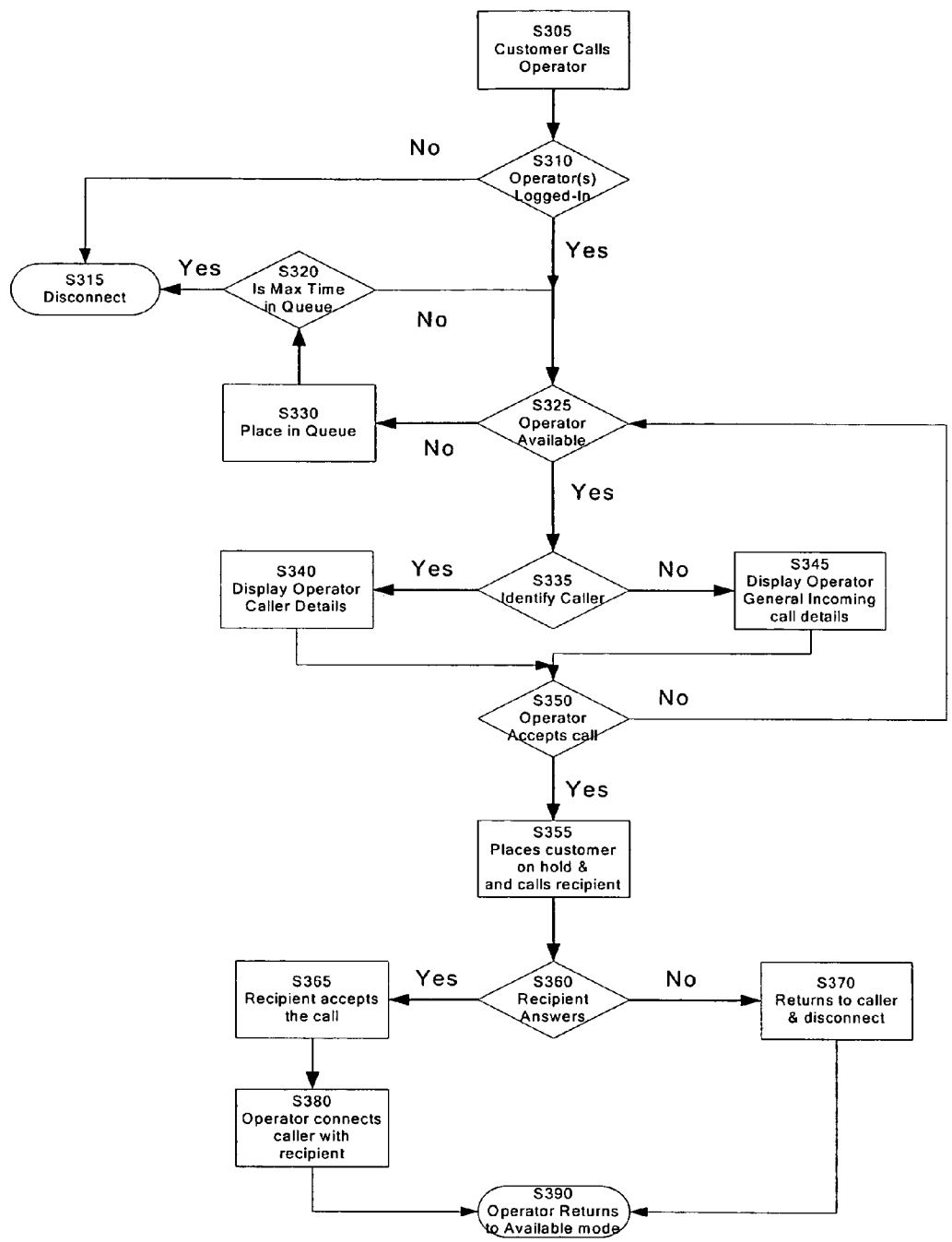
FIG. 3 shows exemplary steps in operator call flow.

FIG. 3 shows an exemplary operator call flow diagram. One skilled in the art will recognize that the procedure described in FIG. 3 and in the description below could be performed in a different order, could include additional steps, or could be performed without certain steps without departing from the scope of the invention. As shown in FIG. 3, an operator call can be initiated when a caller places a call to an operator (S305).

Operator communications can be requested by dialing "000" or any other predetermined sequence of alphanumeric characters. In some embodiments, voice recognition could be used to identify an operator request. In some embodiments, the "operator" can be defined in a gatekeeper as a service associated with the IP address of the Operator Server (230) or another server. The gatekeeper will then direct the call to the designated server.

Operator Login Process

An operator can login to the OS using any suitable Internet browser, such as Microsoft Internet Explorer™ By logging in, the OS acknowledges that the operator is now communicatively accessible to accept calls. The OS requires that at least one operator be logged in for operator services to be provided. Following login, operators can set their status to either "Available" (ready to accept calls) or "Busy" (not available). The OS can be configured to determine if at least one operator is currently logged in (S310).

The OS can be configured so that if no operators are logged in, operator service will not be available and a slide and/or an audio message with an appropriate message can be streamed to an enduser calling the system. If no operators are logged in, the call can also be disconnected (S315).

The OS can be configured to detect whether or not the operators logged in are available (S325). In the event that all operators are busy assisting other callers, the OS server can place pending calls in a queue (S330). Once in the queue, the OS can stream a slide and/or an audio message informing the caller that all operators are currently busy and that the call will be forwarded to the next available operator. Once an operator becomes available, the OS server can then forward the call to that operator. The OS server can be configured so that if a caller has been in the queue for a predetermined amount of time, the call can be disconnected (S320).

OS Call Handling

The OS can be configured to identify a caller based on the caller's originating IP address when an incoming call arrives (S335). In some embodiments, predetermined business rules can be applied to calls based on the caller identification information. For example, caller access to the OS can be prioritized based on customer profiles.

Figure 4:
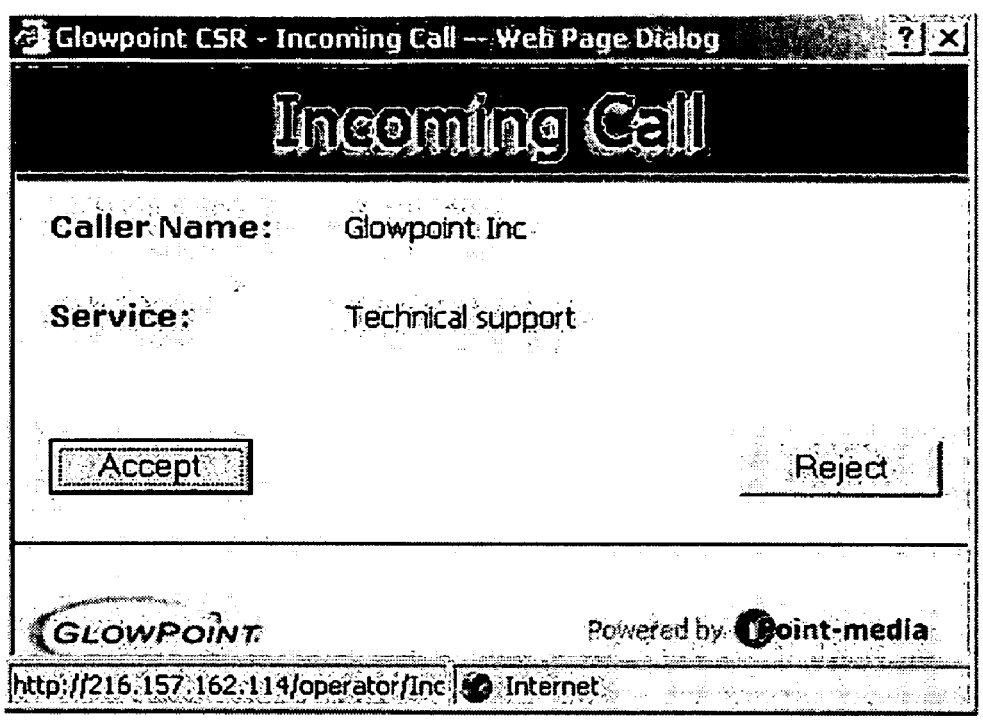
FIG. 4 shows an exemplary incoming call request dialog.

If an operator is available, an incoming call notification can be displayed to the operator including caller details (S340). An exemplary operator call notification is shown in FIG. 4. If caller identification information is not available, basic call information can be provided to the operator (S345). As shown in FIG. 4, the call notification can include the option to accept or reject the call using on-screen buttons. If the operator accepts the incoming call (S350), the caller and the operator can be placed into conference. If the operator refuses to take the call, the OS can be configured to search for another available operator (S325).

Call Transfer

Figure 5:
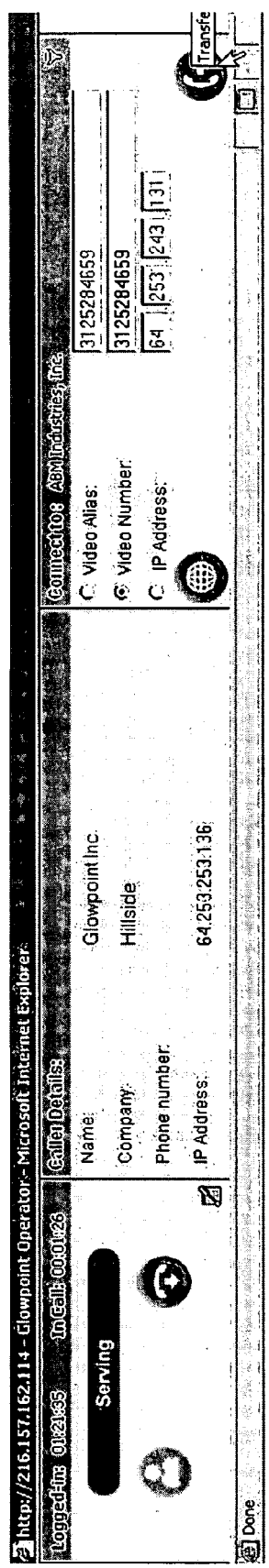
FIG. 5 shows an exemplary call transfer dialog.

Once a caller has established a communication session with an operator, the OS can create a conference between the caller and an intended recipient by placing the caller on hold and establishing a connection with the recipient (S355). If the recipient answers (S360) and accepts (S365) the call, the OS can connect the caller with the recipient (S380) and then disconnect itself from the call. An exemplary call transfer dialog is shown in FIG. 5. If the connection is not successful, the operator returns to the caller and can report the events (S370). After the operator disconnects from the call, the operator can return to the pool of available operators (S390).

With reference to FIG. 2, once the video operator (205) is connected to a caller (210), the video operator (205) can provide information and assistance as well as transfer the call to another H.323 endpoint on the network (220) using OS client software available to the operator (205). The OS client software can be customized application software provided at the operator workstation (205) or it can be a web browser configured to access the operator server (230). Once the operator successfully connects to the recipient video unit (215), the operator (205) can be released from the call by the system, leaving the call originator (210) and the transferred to endpoint (215) connected in a point to point videoconference call. In the event the call transfer fails, the OS can be configured to return the call to the operator (205) and the call originator (210) for further disposition.

Operator User Interface

The OS can be configured to present incoming caller details to a live operator at the time of the conference. The OS can be configured to identify recipients by accessing a customer database on the OS SMU or on another database server. This database can include any subscriber customer information such as the company name, location, IP address, and E.164 alias for any subscriber. The OS application can also display a data field for entering an IP or E.164 phone number associated with a recipient. The operator application can also include a connect-type button for connecting callers and recipients.

Reporting

The OS can be configured to maintain a record of incoming call requests. As non-limiting examples, the information recorded can include caller identification, time of call, time in queue, and time to connect with recipient as well as call statistics and call detail records (CDR) for billing purposes.

Management

The OS can be configured to provide online management functions including Operator Management, Service Management and System Setting Management. Operator Management functions can include, but are not limited to, the ability to add, modify and delete operators. Additionally, individual operators or groups of operators can be associated to services such as, but not limited to, "helpdesk" and "611." Service Management functions can include, but are not limited to, the ability to add, modify and delete services such as "helpdesk" and "611." System Setting Management can include, but is not limited to, management of system timeouts, system configuration and the ability to start and stop services remotely.

Some embodiments of the invention can be configured to support SNMP based management for networked OS servers and can interoperate with existing network management tools.

Monitoring

The OS can be configured to monitor any aspect of OS system performance. With respect to operators, parameters monitored can include, but are not limited to, operators logged in, operators in call, and operators logged off.

With respect to calls, parameters monitored can include, but are not limited to, the total number of current calls, the total bandwidth utilization, the calls in queue, the calls served by operator, the connected calls (including source and destination IP addresses, participants, bandwidth, CODECs used, start time and length), the number of calls per period of time (including operator calls and proxy calls), and the abandoned calls per period of time.

With respect to services, both used and unused services can be monitored. With respect to conferencing servers, parameters managed or monitored can include, but are not limited to, IP addresses, CPU utilization, memory utilization, and running processes. Some or all of these parameters can be managed though SNMP.

Expansion

The OS of the present invention can be used to route calls efficiently not only to operators, but also any other networked support group such as a help desk, a network operations center, or bridging service center. Such routing could be performed in a manner similar to the call routing model currently in use for PSTN systems whereby a caller can dial "0" for operator assistance, "411" for directory assistance, or "611" for technical assistance.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

I claim:

1. A method for operator assisted calls in a video communications network, comprising:
   designating, at a gatekeeper, an operator endpoint as a provider of an operator service;
   receiving, at the gatekeeper, a packet-based videoconference call from a caller endpoint, determining if the videoconference call is an operator call; and
   if the call is an operator call, routing the call to the operator endpoint;
   creating a packet-based videoconference communication session between the caller endpoint and the operator endpoint;
   determining a recipient endpoint of the call;
   suspending the communication session between the caller endpoint and the operator endpoint;
   creating a packet-based videoconference communication session between the operator endpoint and the recipient endpoint; and
   creating a packet-based videoconference communication session between the caller endpoint and the recipient endpoint.

2. The method of claim 1,
   wherein the recipient endpoint is external from the operator endpoint.

3. The method of claim 1, further comprising:
   determining availability of the recipient endpoint, and
   if the recipient endpoint is not available, resuming the communication session between the caller endpoint and the operator endpoint.

4. The method of claim 1, further comprising:
   determining availability of the recipient endpoint, and
   if the recipient endpoint is available, creating a packet-based videoconference communication session between the caller endpoint and the recipient endpoint.

5. The method of claim 4, wherein the communication session between the caller endpoint and the recipient endpoint is created by bridging the communication session between the operator endpoint and the caller endpoint with the communication session between the operator endpoint and the recipient endpoint.

6. The method of claim 5, wherein the communication session between the caller endpoint and the recipient endpoint is bridged at an operator server.

7. The method of claim 5, wherein the communication session between the caller endpoint and the recipient endpoint is bridged with assistance of a live operator.

8. The method of claim 1, further comprising:
   determining if an operator is logged in at the operator endpoint,
   determining if the operator is available to accept an incoming call at the operator endpoint, and
   accepting the call at the operator endpoint.

9. The method of claim 8, further comprising:
   designating, at an operator server, the operator endpoint, and
   notifying the operator endpoint of the call.

10. The method of claim 1, further comprising:
    identifying a source of the call, and
    displaying at least one parameter descriptive of the source of the call at an operator endpoint.

11. The method of claim 1, wherein the packet-based videoconference communication session is an H.323 session.

12. The method of claim 1, wherein the packet-based videoconference communication session is a Session Initiation Protocol session.

13. A system for operator assisted calls in a video communications network comprising:
an operator server in electronic communication with an operator endpoint and a gatekeeper,
wherein the operator server is configured to;
receive a packet-based videoconference call from a caller endpoint and, in response to the call, create a packet-based videoconference communication session between the caller endpoint and the operator endpoint;
determine a recipient endpoint of the call;
suspend the communication session between the caller endpoint and the operator endpoint;
create a packet-based videoconference communication session between the operator endpoint and the recipient endpoint; and
create a packet-based videoconference communication session between the caller endpoint and the recipient endpoint.

14. The system of claim 13, wherein the operator server is further configured to
determine availability of the recipient endpoint, and
resume the communication session between the caller endpoint and the operator endpoint if the recipient endpoint is not available.

15. The system of claim 13, wherein the operator server is further configured to
determine availability of the recipient endpoint, and
create a communication session between the caller endpoint and the recipient endpoint.

16. The system of claim 15, wherein the operator server is further configured to
create the communication session between the caller endpoint and the recipient endpoint by bridging the communication session between the operator endpoint and the caller endpoint with the communication session between the operator endpoint and the recipient endpoint.

17. The system of claim 16, wherein the operator server is further configured to bridge the communication session between the caller endpoint and the recipient endpoint at the operator server.

18. The system of claim 16, wherein the operator server is further configured to bridge the communication session between the caller endpoint and the recipient endpoint with assistance of a live operator.

19. A system for operator assisted calls in a video communications network comprising:
an operator server in electronic communication with an operator endpoint and a gatekeeper, wherein the operator server is configured to,
receive a packet-based videoconference call from a caller endpoint and, in response to the call, create a packet-based videoconference communication session between the caller endpoint and the operator endpoint, determine if an operator at an operator endpoint is logged in,
determine if the operator at the operator endpoint is available to accept an incoming call, and
create a packet-based videoconference communication session between the operator endpoint and the caller endpoint.

20. The system of claim 13, wherein the operator server is further configured to
store a designation of the operator endpoint, and
notify the designated operator endpoint of the call.

21. The system of claim 20, wherein the operator server is further configured to
identify the source of the call, and
transmit at least one parameter descriptive of the source of the call to the operator endpoint.

22. The system of claim 13, wherein the packet-based videoconference communication session is an H.323 session.

23. The system of claim 13, wherein the packet-based videoconference communication session is a Session Initiation Protocol session.

* * * * *